US00RE40818E

(19) United States
(12) Reissued Patent
Gatley, Jr.

(10) Patent Number: US RE40,818 E
(45) Date of Reissued Patent: Jul. 7, 2009

(54) BLOWER HOUSING WITH MAXIMIZED INTERIOR SPACING

(76) Inventor: William Stuart Gatley, Jr., 401 Main, Suite E, Cassville, MO (US) 65625

(21) Appl. No.: 11/117,773

(22) Filed: Apr. 28, 2005

Related U.S. Patent Documents

Reissue of:
(64) Patent No.: 6,553,923
Issued: Apr. 29, 2003
Appl. No.: 10/127,958
Filed: Apr. 23, 2002

U.S. Applications:
(63) Continuation of application No. 09/651,650, filed on Aug. 30, 2000, now Pat. No. 6,386,123.

(51) Int. Cl.
*F03D 11/04* (2006.01)
*F03B 11/00* (2006.01)

(52) U.S. Cl. ..... 110/162; 415/206; 415/213.1
(58) Field of Classification Search ..... 415/213.1, 415/214.1, 182.1, 203, 206, 224; 454/16; 110/205, 206, 214, 297, 147, 162
See application file for complete search history.

(56) References Cited

U.S. PATENT DOCUMENTS

| | | | |
|---|---|---|---|
| 87,523 | A | 3/1869 | Sturtevant |
| 1,271,072 | A | 7/1918 | Parsons |
| 1,584,944 | A | 5/1926 | Johnson |
| 1,650,873 | A | 11/1927 | Kay |
| 2,142,834 | A | 1/1939 | Bergstrom |
| 2,290,423 | A | 7/1942 | Funk |
| 2,518,869 | A | 8/1950 | Corless |
| 3,007,417 | A | 11/1961 | Feltus |
| 3,485,443 | A | 12/1969 | Earhart |
| 3,561,885 | A | 2/1971 | Lake |
| 3,627,442 | A | 12/1971 | Brandt |
| 3,776,660 | A | 12/1973 | Anderson et al. |
| 3,861,339 | A | 1/1975 | Aida et al. |
| 3,902,045 | A | 8/1975 | Laing |
| 4,599,042 | A | 7/1986 | Colliver |
| 4,629,221 | A | 12/1986 | Lumsden et al. |
| 4,865,517 | A | 9/1989 | Beehler |
| 5,141,397 | A | 8/1992 | Sullivan |
| 5,192,182 | A | 3/1993 | Possel |
| 5,257,904 | A | 11/1993 | Sullivan |
| 5,314,300 | A | 5/1994 | Gatley et al. |
| 5,351,632 | A | 10/1994 | Mann |
| 5,443,364 | A | 8/1995 | Mistry et al. |
| 5,573,383 | A | 11/1996 | Uemura et al. |
| 5,620,302 | A | 4/1997 | Garrison et al. |
| 5,820,458 | A | 10/1998 | Lai |
| 5,947,682 | A | 9/1999 | Moon |
| 5,954,476 | A | 9/1999 | Stewart et al. |
| 6,038,756 | A | 3/2000 | Banks |
| 6,152,646 | A | 11/2000 | Muller-Blech et al. |
| 6,260,254 | B1 | 7/2001 | Mueller et al. |

FOREIGN PATENT DOCUMENTS

| | | |
|---|---|---|
| WO | WO 95/32363 | 11/1995 |

*Primary Examiner*—Kenneth Rinehart
(74) *Attorney, Agent, or Firm*—Thompson Coburn LLP

(57) ABSTRACT

A blower for a high efficiency furnace is provided with an increased interior space for accommodating an impeller of maximum practicable diameter. The blower includes a blower motor and a blower housing having a bottom piece and a top piece assembling with the bottom piece to define an interior of the blower housing. The top piece includes an annular lower support portion for supporting the blower motor and an annular upper portion extending above and around the lower portion. The upper portion has an outer peripheral edge and lugs extending outward beyond the outer peripheral edge. The lugs have lug holes to receive mechanical fasteners to secure the blower housing to an external device. The head of the mechanical fasteners are positioned above the lugs on the upper portion of the top piece. In this arrangement the diameter of the bottom piece is not limited by a need to accommodate spacing for the head of the mechanical fastener. Additionally, the top piece and bottom piece have interlocking internal seals that provide positive engagement when the blower housing is assembled.

11 Claims, 5 Drawing Sheets

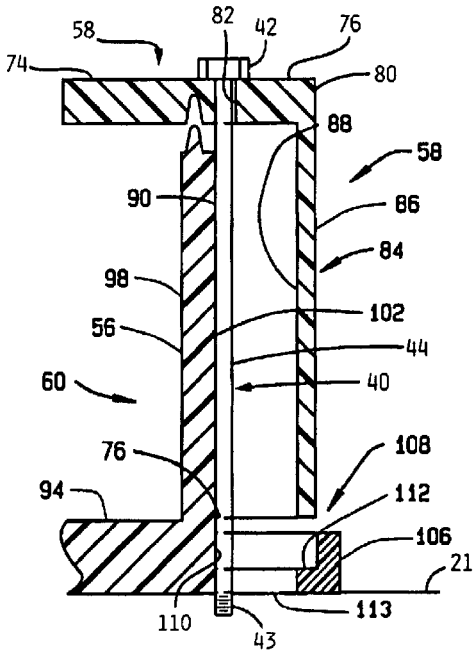
FIG. 9
Amended

BLOWER HOUSING WITH MAXIMIZED INTERIOR SPACING

Matter enclosed in heavy brackets [ ] appears in the original patent but forms no part of this reissue specification; matter printed in italics indicates the additions made by reissue.

This application is a continuation of patent application Ser. No. 09/651,650, filed Aug. 30, 2000, now U.S. Pat. No. 6,386,123 and presently pending.

BACKGROUND OF THE INVENTION (1) Field of the Invention

The present invention relates to blowers used on high efficiency (e.g. 90% or higher efficiency) furnaces for drawing air from outside the home into the furnace to support combustion and for expelling the combustion exhaust products outside the home. More particularly, the invention relates to a construction of a blower housing that maximizes the interior space available for the blower impeller.

(2) Description of the Related Art

Combustion blowers for high efficiency furnaces are common in the art. These blowers are used to draw air for combustion from outside the home. Generally, these blowers are located downstream of a combustion chamber or combustion tubes in the furnace, depending upon the style of furnace, into which the combustion air is drawn, mixed with fuel, and ignited to generate heat for the furnace. The exhaust gases are drawn into the suction side of the blower and discharged from the blower through an exhaust pipe that vents to outside atmosphere.

Although the mounting arrangement and available space inside the blower is similar between one furnace model and the next, each model of furnace typically is designed to use a specific type and size blower. Among other general specifications set by the furnace manufacturer, the blower must meet requirements for dimensional size, mounting arrangements, and air moving capacity. In particular, the size of the blower housing must fit within a given space which then in turn determines the location of mounting holes in the furnace bonnet. Thus, these dimensional size requirements limit the air moving capacity of a blower because the impeller size must be chosen to fit and operate efficiently within the given size housing.

In order to increase the air moving capacity of the blower given the fixed size for the blower housing and the impeller, the designer may choose to increase the speed of the impeller. This in turn requires that the blower be operated with a higher speed motor. This option has significant drawbacks, including increased cost to buy, to operate, and increased noise. The speed of the motor and the speed of the impeller must be closely matched to maximize efficiency of the impeller. This requires additional engineering considerations in designing the impeller to operate efficiently at increased speeds. Efficient high speed motors are generally more expensive and tends to increase the cost of the blower. A blower with a higher speed motor also tends to produce more noise and vibration. The higher speed motor also has greater electrical demands. High speed blower motors tend to operate at higher temperatures and generate more heat than lower speed motors. Since the motor is in close proximity to hot exhaust gases in the blower, higher speed motors may require auxiliary cooling systems such as a shaft mounted fan, or a larger bonnet interior to avoid heat buildup. Auxiliary cooling systems lower motor efficiency, and the higher operating temperatures tend to decrease the life cycle of the blower motor.

FIG. 1 shows a blower 20 of the prior art arranged on a blower mounting surface 21 of a furnace 22. The blower 20 includes a blower motor (not shown) and a blower housing 24. In FIG. 1, the blower motor has been removed from its center mount 26 on top of the blower housing 24 to show greater detail of the blower housing 24. The blower housing 24 has a side wall 28 extending between a top piece 30 and a bottom piece 32. The top piece 30 is molded with the center mount recess 26 to receive the blower motor (not shown). The side wall 28, top piece 30, and bottom piece 32 form a volute 34 for the blower housing 24. When the blower 20 is energized, an impeller (not shown), operably connected to a shaft of the blower motor (not shown), rotates in the volute 34 to draw exhaust gases through an inlet hole 35 in the center of the bottom piece 32 and to compress gases in the volute 34. The pressurized exhaust gases are directed into a discharge pipe 36 that extends outward and away from the blower 20 and the furnace 22.

As shown in FIG. 1, mounting feet 38 for attaching the blower 20 to the blower mounting surface 21 of the furnace 22 are provided on the side wall 28 of the blower housing 24. In order to secure the blower housing 24 to the furnace, mechanical fasteners 40 are used. The typical mechanical fastener 40 used to secure the blower 20 to the furnace 22 has a screw head driving end 42 and an opposite driven end 43 spaced from the driving end 42 by a shaft 44. The driving end 42 is larger than the shaft 44 such that it engages a sealing surface 46 on the mounting foot 38 and holds the blower 20 to the furnace. The seating surface 46 of the mounting foot 38 is sized to allow clearance between the driving end 42 of the fastener 40 and the side wall 28 of the blower housing 24.

In the construction of older blower housings, a cut-out in the side wall of the blower housing is sometimes provided adjacent the mounting feet for clearance of the driving end of the mechanical fastener. A sponge foam rubber or rubber type sealing insert is then used once the fastener is installed to completely seal the housing along the narrow spacing adjacent the driving end of the fastener. These inserts and gaskets are problematic in that they tend to leak over time and represent the weak link in exhaust system integrity. Additionally, some blower housing constructions require the use of gasket material to build up the axial height of the bottom piece in the area of the mounting foot when the blower is installed on the furnace. This gasket material seals the blower housing in the area of the mechanical fastener and prevents the mounting foot from heeling over when the mechanical fastener is tightened and the blower housing is attached to the furnace.

What is needed to overcome the disadvantages of the prior art is a blower housing which has a maximized interior space to permit the use of the largest capacity impeller practicable while meeting the size restrictions set by the mounting holes located in the furnace by the manufacturer. The blower housing having the largest practicable capacity impeller would meet the manufacturer's requirements for air moving capacity with a lower speed motor. Such a blower would meet furnace manufacturers' specifications for air moving capacity with decreased noise and vibration, and cost for the blower. Additionally, such a blower would eliminate the need for sealing inserts or gasket materials at the mounting locations for the blower housing.

SUMMARY OF THE INVENTION

In order to overcome the disadvantages of the prior art, the blower of the present invention provides an increased interior spacing while maintaining fixed exterior dimensions including especially the mounting hole locations. By having a larger interior for containing a larger impeller than in the prior art design, the blower of the present invention is capable of generating a higher air moving capacity with a decreased operating speed, cost, and lower noise and vibration levels. The blower of present invention also improves the containment of exhaust gases in the blower housing by improving the integrity of the seal around the housing against the furnace bonnet.

The blower of the present invention includes a blower housing and a blower motor. The blower housing has a top piece, a side wall, and a bottom piece that detachably engages the top piece to enclose the blower housing. The top piece includes an annular lower support portion for supporting the blower motor and an annular upper portion extending above and around the lower portion. The upper portion of the top piece of the blower housing has an outer peripheral edge and at least one lug extending outwardly beyond its outer peripheral edge. The bottom piece of the blower housing has a flange extending beyond its periphery that aligns with the lug of the top piece when the blower housing is assembled. The flange interlocks with the lug to detachably engage the top piece to the bottom piece. The top piece, side wall and bottom piece thus form a volute for the blower housing when assembled.

The lug on the top piece has a lug hole to receive a mechanical fastener such as a threaded bolt or screw. The flange on the bottom piece preferably has a flange hole that receives the mechanical fastener therethrough when the mechanical fastener joins the top piece to the blower mounting surface of the furnace. The mechanical fastener preferably attaches the blower housing to the furnace such that the blower housing is positioned between a blower motor and exterior mounting surface of the furnace. Thus, by locating the mechanical fastener with its head above the top piece, it may be driven tightly against the lug at the top of the blower and space need not be provided for the head of the mechanical fastener to be driven tightly against a blower housing surface which itself is located within the envelope of the impeller space.

In other words, in the prior art construction as seen in FIG. 1, a seating surface 46 is provided against which the driving end must be snugged to adequately secure the blower to the furnace. This requires a shoulder of a minimum width between the lug hole and the blower housing sidewall, which shoulder width (along with any clearance between the mounting hole sidewall and the shoulder) represents wasted space as the location of the blower housing sidewall is what limits the diameter of the impeller. With the present invention, the blower housing sidewall may be immediately adjacent the shaft 44 as the driving end is snugged against a surface located above the blower housing sidewall. Thus, little clearance need be provided between the shaft as the screwdriver or other tool used to secure the mechanical fastener has complete and unimpeded access to the driving end as it remains above the blower housing.

In another aspect of the present invention, the blower housing is provided with an improved seal between the top and bottom pieces. Preferably, the blower housing comprises a bottom piece having a disk shaped bottom portion with an outer perimeter border and an upstanding annular wall extending outward from the bottom disk around the outer perimeter border. The upstanding annular wall has an interior surface that forms a portion of the volute for the blower housing. The upstanding wall has an annular end axially opposite the bottom disk portion that extends between the exterior and interior surfaces of the upstanding wall. The annular end has an annular lip axially spaced from the annular end.

The top piece fits over the bottom piece to enclose the volute and form a casing for the blower. The top piece has a lower portion recessed into the top piece and extending into the casing. This lower portion receives the blower motor. The top piece also has an upper portion which extends around and above the lower portion. The upper portion has a primary groove and an outer peripheral edge surrounding the primary groove. The primary groove has an annular outer side wall and an annular inner side wall spaced apart by an annular groove wall. The groove wall has a secondary groove intermediate the coterminous edges of the groove wall and inner and outer side walls. The inner side wall of the primary groove abuts the interior surface of the upstanding wall of the bottom piece and the annular lip of the bottom piece is received in the secondary groove when the casing is assembled.

The inner side wall of the primary groove preferably has an annular rib extending outwardly from the side wall into the primary groove. The interior surface of the upstanding annular wall preferably has an annular notch on its interior surface. In this arrangement, as the annular notch receives the annular rib in the primary groove, the pieces tend to "snap" together as the bottom piece is fully assembly with the top piece. This construction thus provides a positive indicator of sealing between the top and bottom pieces when the blower housing is assembled.

BRIEF DESCRIPTION OF SEVERAL VIEWS OF THE DRAWINGS

Further objects and features of the invention are revealed in the following detailed description of the preferred embodiment of the invention and in the drawings wherein:

FIG. 9 is a cross-sectional view of the top piece installed with the bottom piece to form the blower housing of FIG. 3.

Corresponding reference numerals indicate corresponding parts throughout the several views of the drawings.

DETAILED DESCRIPTION OF THE PREFERRED EMBODIMENT

Figure 1:
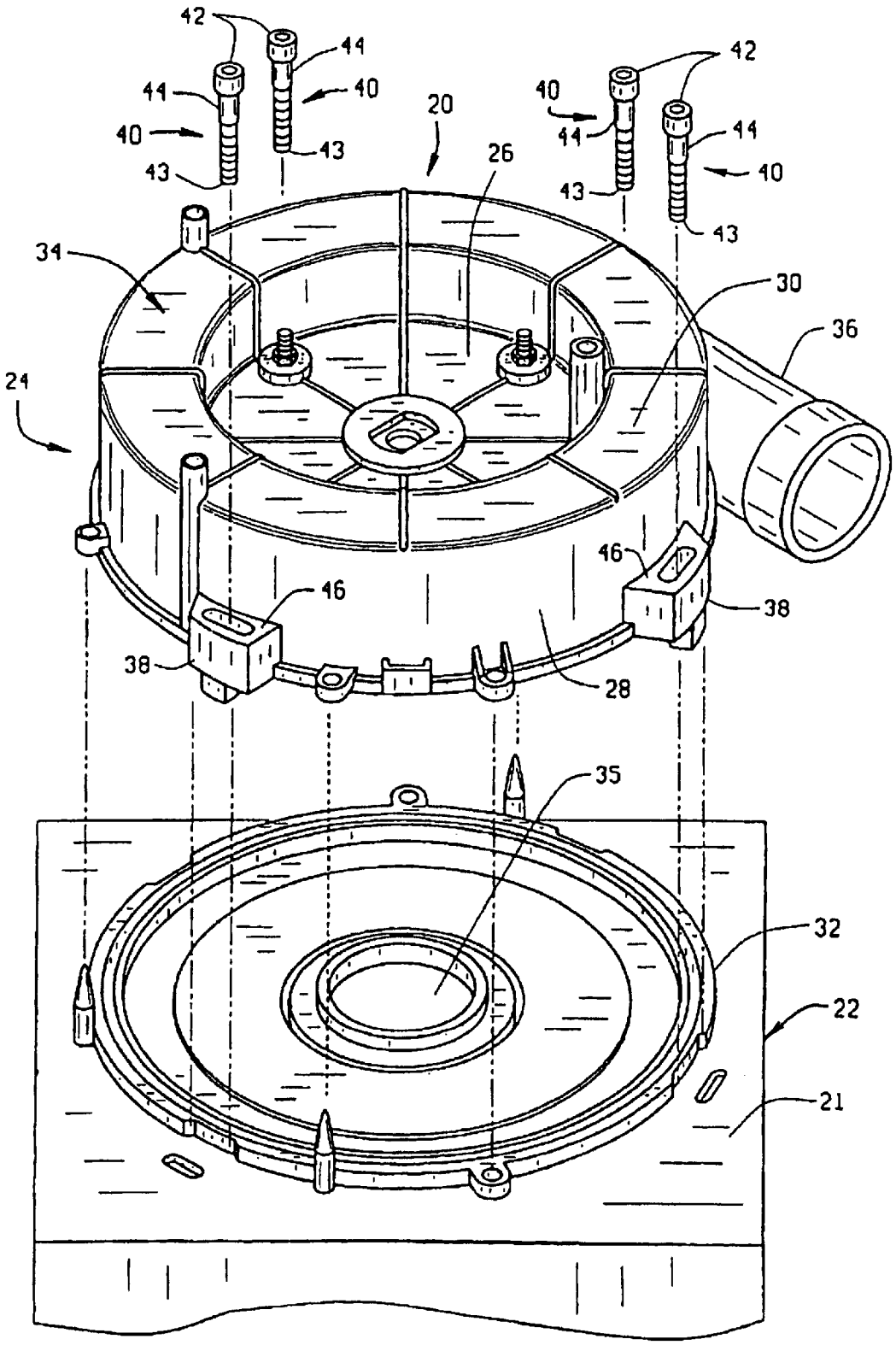
FIG. 1 PRIOR ART
FIG. 1 is an exploded, perspective view of a blower of the prior art.
Figure 2:
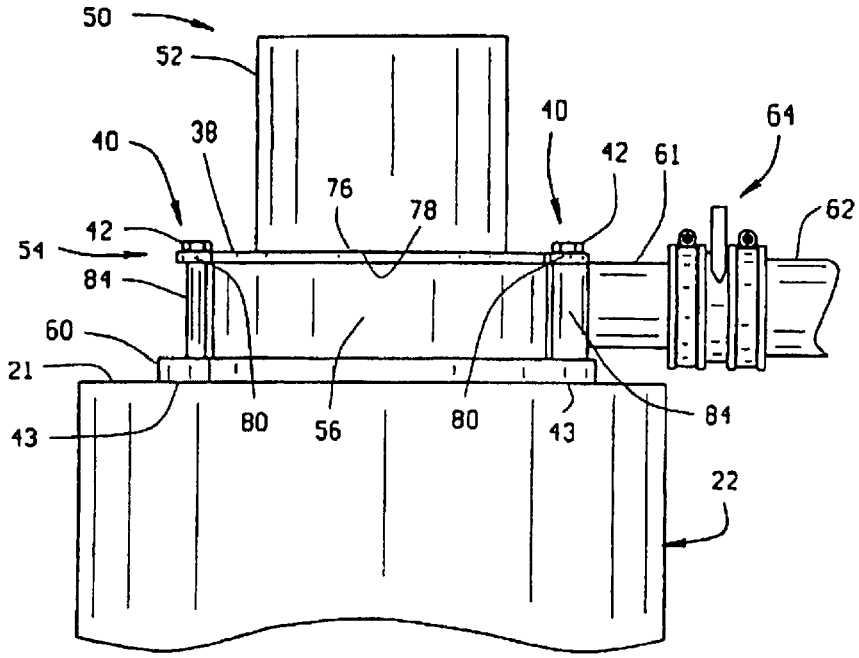
FIG. 2 is a side view of a blower of the present invention installed on a mounting structure of the furnace.

FIG. 2 shows the blower of the present invention installed in a furnace. The blower 50 includes a blower motor 52 and a blower housing 54. The blower housing 54 has an annular upstanding wall 56 extending between a top piece 58 and bottom piece 60. The bottom piece 60 is mounted on a blower mounting surface 21 in the furnace 22, or the furnace bonnet, using mechanical fasteners 40. The driving end 42 of each of the fasteners 40 seats against the top most portion of top piece 58 and the driven end 43 is installed in the blower mounting surface 21 on the furnace 22. In the arrangement shown in FIG. 2, the bottom piece 60 is preferably held in position between the top piece 58 and the blower mounting surface 21 by compression from the mechanical fasteners 40.

As shown in FIG. 2, the blower 50 is mounted on a blower mounting surface 21 on the furnace 22 where the blower housing 54 is positioned to allow the impeller (not shown) to draw exhaust gases directly from the combustion chamber or combustion tubes (not shown) into the blower housing 54. A discharge pipe 61 is coupled to an exhaust pipe 62 using a gasket 64 to vent the exhaust gases to atmosphere.

Figure 3:
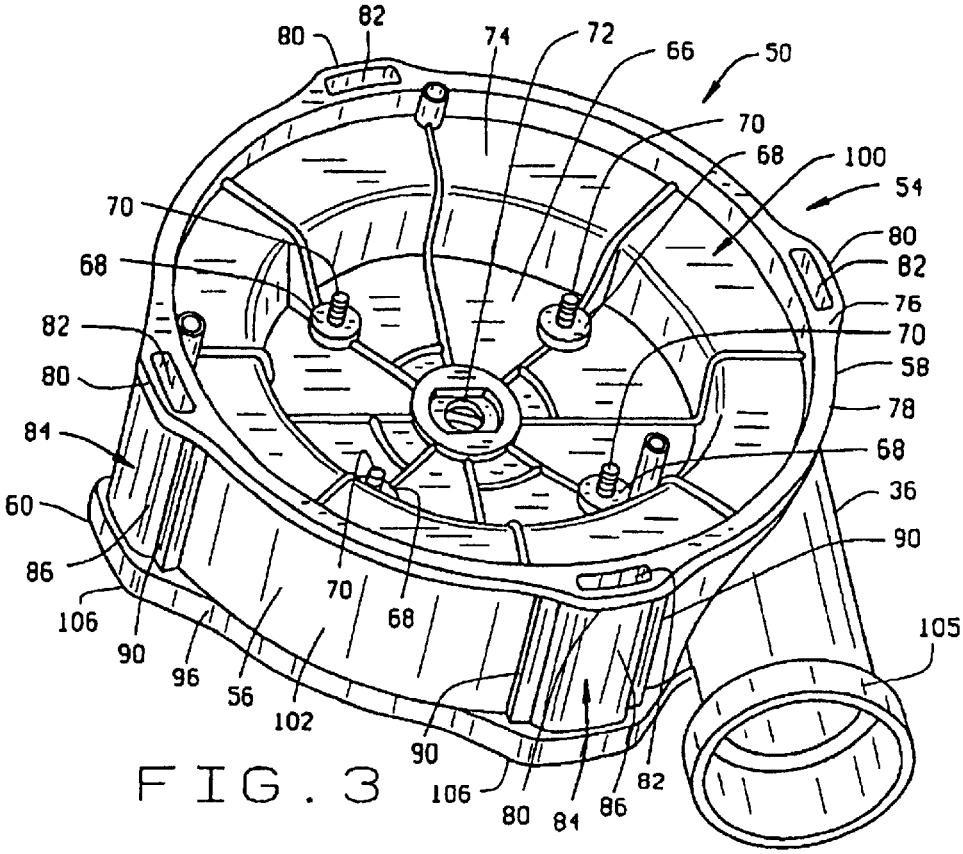
FIG. 3 is a perspective view of a blower housing of the blower of FIG. 2.

FIG. 3 shows a perspective view of the blower housing 54 with top piece assembled on the bottom piece 60. The top piece 58 covers over the bottom piece 60 to tightly enclose the blower housing 54 and prevent exhaust gases from leaking from the blower housing 54 during operation. The top piece 58 has a lower portion 66 that is received into the top piece 58 and extends into the blower housing casing 54. The diameter of the recessed lower portion 66 is sized to accommodate the blower motor 52. The lower portion 66 has mounting fittings 68 for securing the blower motor to the top piece 58. The lower portion 66 may also have screw fittings 70 for securing the motor to the top piece 58. At the center of the lower portion 66, a through hole 72 is provided to allow a shaft (not shown) from the blower motor to pass into the interior of the blower housing 54 to be coupled with the impeller (not shown). The top piece 58 has an upper portion 74 which extends around and above the lower portion 66 and includes a seating surface 76 for the mechanical fasteners 40.

Figure 4:
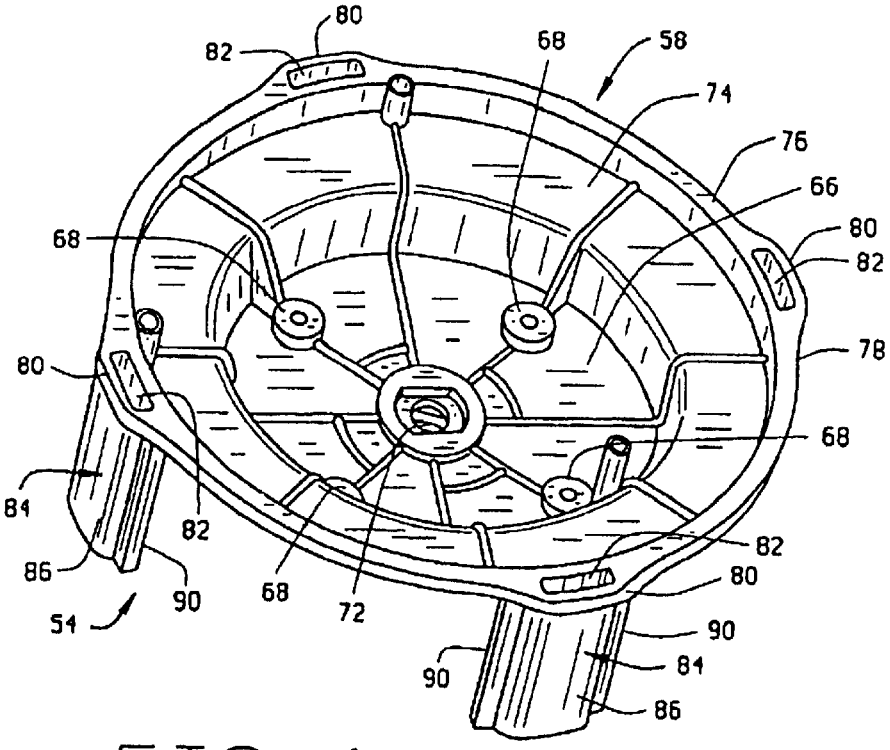
FIG. 4 is a top, perspective view of a top piece of the blower housing of FIG. 3.
Figure 5:
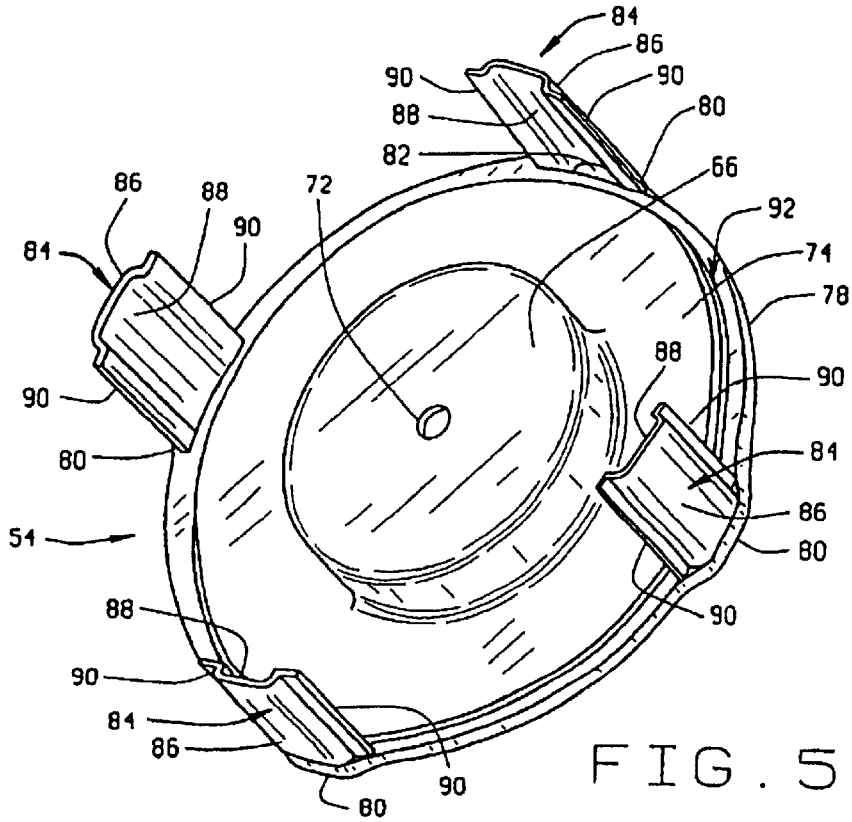
FIG. 5 is a bottom, perspective view of the top piece of FIG. 4.

FIGS. 4 and 5 provide greater detail of the top piece 58. The upper portion 74 of the top piece 58 has an outer peripheral edge 78 and lugs 80 extending radially outward beyond the outer peripheral edge 78. The lugs 80 preferably have arcuate lug holes 82 formed therein to allow adjustable positioning of the blower housing 54 on the blower mounting surface 21 of the furnace 22 when the blower 50 is installed on the furnace 22. Preferably, each of the lugs 80 has a depending leg 84 extending downward and away from the outer peripheral edge 78 of the top piece 58. Each leg 84 preferably has an exterior surface 86 and an arcuate interior surface 88 which gives each leg 84 a generally concave aspect when it is installed on the blower housing 54. The arcuate interior surface 88 of the depending leg 84 preferably has a circumferential guide portion 90 that conforms to the upstanding annular wall 56 on the bottom piece 60. The circumferential guide portion 90 on the depending leg 84 supports and aligns the top piece 58 with the bottom piece 60 during operation. The depending leg 84 bears some of the weight of the blower motor when the blower 50 is installed on the blower mounting surface 21 of the furnace 22.

As shown in FIG. 5, an annular locating groove 92 is provided around the upper portion 74 radially inward of the outer peripheral edge 78. The annular locating groove 92 is positioned a sufficient distance away from the outer peripheral edge 78, lug hole 82, and depending leg 84 so as not to interfere with the seal between the top piece 58 and bottom piece 60 when the blower housing 54 is assembled. Greater detail of the annular locating groove 92 and seal between the top and bottom pieces 58,60 will be discussed later with reference to FIG. 8.

Figure 6:
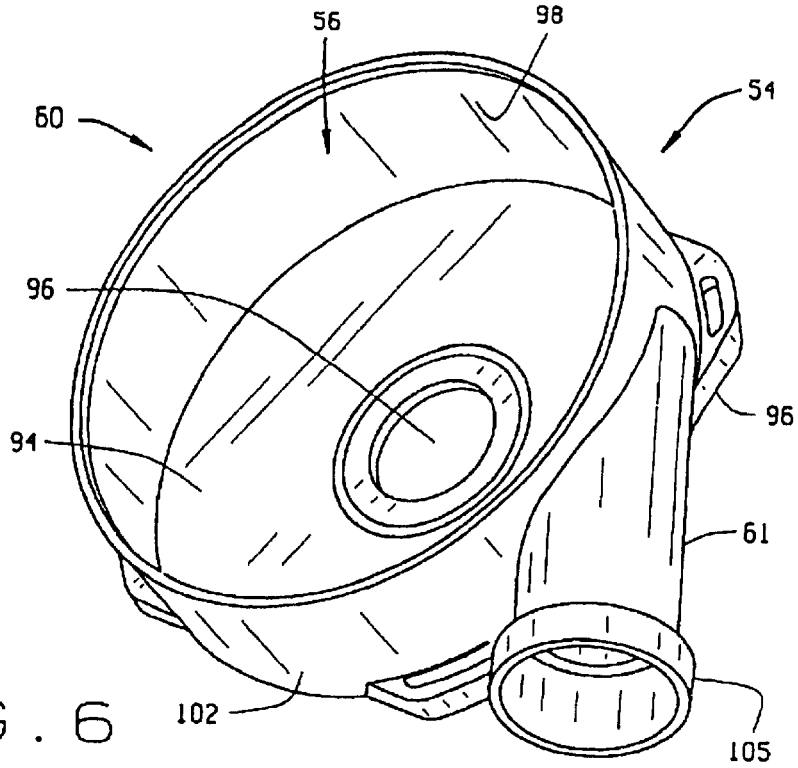
FIG. 6 is a top, perspective view of a bottom piece of the blower housing of FIG. 3.
Figure 7:
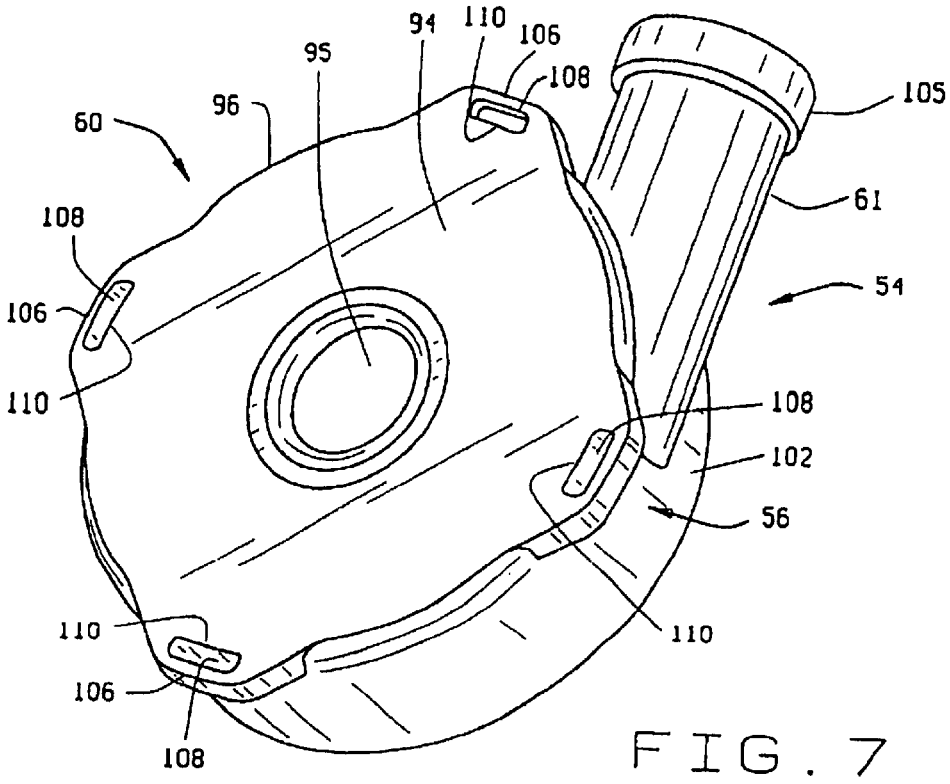
FIG. 7 is a bottom, perspective view of the bottom piece of FIG. 6.

FIGS. 6 and 7 provide detail of the bottom piece 60 of the blower housing 54. The bottom piece 60 has a bottom disk portion 94 with a center inlet hole 95 that allows the blower 50 to draw exhaust gases into the housing 54 during blower operation. The bottom disk portion 94 has an outer perimeter border 96 and the upstanding annular wall 56 extends outward and away from the outer perimeter border 96. The underside of the bottom disk portion 94 of the blower housing 54 is generally flat so that it may be mounted flush against the blower mounting surface 21 of the furnace 22. The upstanding annular wall 56 has an interior surface 98 which defines a portion of a volute 100 of the blower housing 54 and an exterior surface 102 that surrounds the interior surface 98. The discharge pipe 61 extends outward and away from the annular wall 56 and communicates with the volute 100 to direct pressurized exhaust gases from the blower housing 54. The discharge pipe 61 may have a boss end 105 to allow connection to the exhaust pipe 62, as required. Preferably, the bottom disk portion 94, the upstanding wall 56, and the discharge pipe 61 are formed monolithically.

The bottom piece 58 is provided with a plurality of mounting flanges 106 circumferentially spaced around the outer perimeter border 96 of the bottom disk portion 94. Each of the mounting flanges 106 extends radially outward from the outer perimeter border 96 and has a flange hole 108 therethrough. Each of the mounting flanges 106 preferably aligns with a corresponding lug 80 on the top piece 58. The alignment of the lugs 80 and flanges 106 may be such that the top piece 58 and bottom piece 60 are assembled in only one orientation. Similar to the lug hole 82, the flange hole 108 is also preferably arcuate to allow minor adjustment of the blower 50 when the blower 50 is mounted on the blower mounting surface 21 of the furnace 22. To maximize the diameter of the upstanding annular wall 56, an inner edge 110 of the flange hole 108 may be formed flush with the exterior surface 102 of the upstanding annular wall 56.

Preferably, the flange hole 108 is also formed to receive the depending leg 84 of the top piece 58 when the blower 50 is assembled. As shown in FIG. 9, the flange hole 108 preferably has a step recess 112 which is shaped to receive the depending leg 84 from the lug 80 of the top piece 58 and a through hole 113. The through hole 113 allows the mechanical fastener to be directed from the lug 80 and lug hole 82 on the top piece 58 to the blower mounting surface 21 on the furnace 22 when the blower 50 is secured to the blower mounting surface 21 on the furnace 22. The step recess 112 positively aligns the depending leg 84 and captures a bottom portion of the circumferential guide portion 90 of the depending leg 84 so that the top piece 58 and bottom piece 60 are positively engaged both during assembly and operation of the blower 50. It is preferred that the bottom piece 60 be held in position by the compressive forces exerted by the mechanical fastener 40 on the top piece 58. The step recess 112 bears some of this compressive force and stabilizes the position of the bottom piece 60 adjacent the blower mounting surface 21 of the furnace 22.

Figure 8:
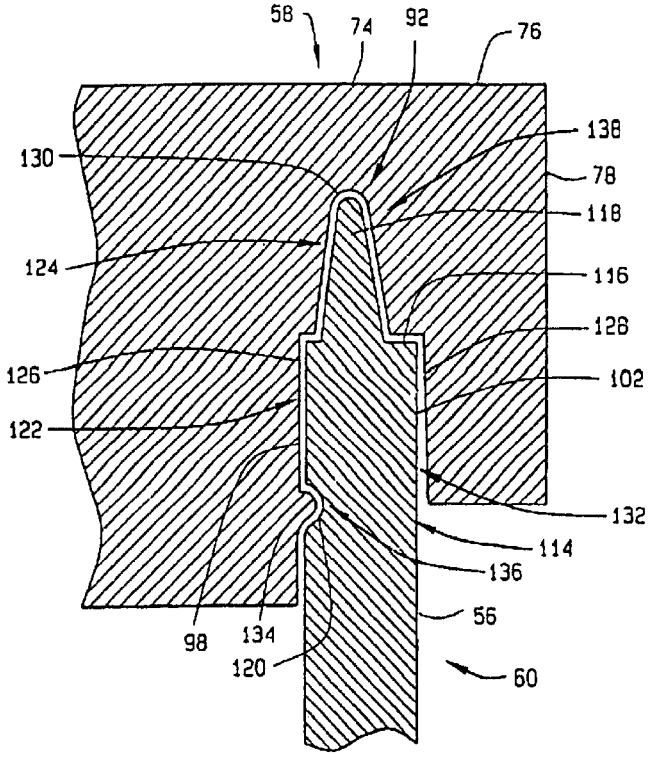
FIG. 8 is a cross-sectional view of the top piece installed with the bottom piece to form the blower housing of FIG. 3.

Details of the attachment between the top and bottom pieces are best shown in FIG. 8. The upstanding annular wall 56 of the bottom piece 60 has an upper section 114 that cooperates with the annular groove 92 in the upper portion 74 of the top piece 58. The upper section 114 includes an annular end 116 that extends between the interior and exterior surfaces 98,102 of the upstanding wall 56. The annular end 116 has a lip 118 extending axially outward from the bottom disk portion 94 intermediate the coterminous edges of the annular end 116 and the interior and exterior surfaces 98,102 of the upstanding annular wall 56. Preferably, the annular lip 118 has a generally triangular shaped cross section to act as a guide during assembly as well as an overlapping fit between the top and bottom pieces 58,60. The upper section 114 also importantly includes an annular notch 120 extending around the interior surface 98 of the upstanding wall 56.

The annular groove 92 formed in the upper portion 74 of the top piece 58 includes a primary groove 122 and a secondary groove 124. The primary groove 122 includes an annular inner side wall 126 and an annular outer side wall 128 spaced apart from the annular inner side wall 126 by an annular groove wall 130. When the top piece 58 is installed on the bottom piece 60, the annular inner side wall 126 abuts the interior surface 98 of the upstanding annular wall 56, and the annular outer side wall 128 faces the exterior surface 102 of the upstanding annular wall 56. The annular outer side wall 128 may be formed with a lead-in taper 132 to allow the top and bottom pieces 58,60 to more easily fit together.

The primary groove 122 also includes an annular rib 134 axially spaced below the annular groove wall 130. The annular rib 134 cooperates with the annular notch 120 in the upstanding annular wall 56 of the bottom piece 58 to form a first sealing area 136 for the blower housing 54. When the top piece 58 is fully installed on the bottom piece 60, the top piece 58 will snap fit onto the bottom piece 60 as the annular rib 134 slides across the interior surface 98 of the upstanding annular wall 56 and into the annular notch 120. The rib 134 and notch 120 provide a positive lock indication for a blower assembly operator when assembling the blower housing 54.

The secondary groove 124 in the annular groove 92 on the upper portion 74 of the top piece 58 is formed internal to primary groove 122. The secondary groove 124 is formed intermediate the coterminous edges of the annular groove wall 130 and inner and outer side walls 126,128. The secondary groove 124 has a generally triangular shaped cross section that matches the geometry of the annular lip 118 on the upstanding wall 56 of the bottom piece 60. The secondary groove 124 provides a secondary sealing area 138 for the blower housing.

In assembling the blower housing 50 into the arrangement shown in FIG. 3, the top piece 58 may be installed with the bottom piece 60 to create the blower housing 54 of the present invention. The upper section 114 of the annular wall 56 of the bottom piece 60 may be inserted into the annular groove 92 on the underside of the top piece 58 and positively locked in place to seal the blower housing 54.

The depending legs 84 of the lug 80 of the top piece 58 may be inserted into the step recess 112 formed in the flange hole 108 such that the circumferential guide portion 90 of the interior arcuate surface 88 of the depending lug 84 mounts flush against the exterior surface 102 of the upstanding annular wall 56 of the bottom piece 60 and a bottom portion of the leg 84 is nested within the recess 112 of the flange hole 108. Preferably, the lengths of the depending legs 84 are sized such that when the upper section 114 of the annular wall 56 is fully inserted into the annular groove 92 in the top piece 58, the leg 84 is captured by the flange hole 108. The lugs 80 and matching flanges 106 may have irregular angular placement along each of the respective top and bottom pieces 58,60 to provide a keying assembly for the blower housing 54 such that the top and bottom pieces 58,60 may be assembled in only one orientation.

Each of the top and bottom pieces 58,60 may be formed from materials that are capable of withstanding relatively high temperatures from the exhaust gases being expelled from the blower housing 54. The blower housing 54 may be made from a polypropylene or polyvinyl chloride (PVC) type plastic, although other materials capable of withstanding the heat from the exhaust gases may also be used. The material used must be sufficiently resilient to allow the top piece 58 and bottom piece 60 to flex during installation so that the top piece 58 and bottom piece 60 may properly form the primary and secondary seals 136,138 in the blower housing 54.

By locating the lugs 80 on the upper portion 74 of the blower housing 54, the diameter of the upstanding annular wall 56 can be increased. By moving the driving end 42 of the mechanical fastener 40 above the lug 80 on the top piece 58, the clearance between the screw head driving end 42 and the upstanding annular wall 56 of the blower housing 50, as well as any clearance between the shaft and the opening through which it extends can be eliminated. The mechanical fastener 40 used to secure the blower housing to the blower mounting surface of the furnace may run directly down the exterior surface 102 of the upstanding annular wall 56 because there is sufficient clearance on the upper portion 74 of the top piece 58 for the screw head driving end 42 of the mechanical fastener 40. Furthermore, there may also be a savings in assembly time as the driving head is much more readily accessible with the fastening tool making it easier to apply the tool to the driving head.

As the top piece 58 snap fits with the bottom piece 60 to create a sealed unit, gasket materials and other sealing inserts commonly used in the prior art are no longer needed. By constructing the bottom piece 60 with a flat bottom disk and an upstanding annular wall 56 extending from the outer perimeter border 96 of the bottom disk portion 94, and a top piece with the annular grove 92, the locations for the seals 136,138 between the top piece 58 and bottom piece 60 are moved to a position on the blower housing 54 where use of mechanical fasteners 40 does not interfere with the integrity of the seals 136,138. By locating the lugs 80 on the outer peripheral edge 78 of the upper portion 74 of the top piece 58, the upper portion 74 of the top piece 58 may flex inward such that the normally tapered outer side wall 128 of the primary groove 122 contacts the exterior surface 102 of the upstanding wall 56. Thus, the combination of the primary seal 136 and internal secondary seal 138 provides improved sealing characteristics for the blower housing 54 not found in the prior art.

Although the description of the blower housing presented herein refers to a primary and secondary seals formed on respective portions of the top and bottom pieces, it should be noted that the location and combination of the components comprising the primary and secondary seals may be reversed and positioned on the other of the top and bottom pieces of the blower housing.

Various other changes to the preferred embodiment of this invention described above may be envisioned by those of ordinary skill in the art. However, those changes and modifications should be considered as part of the invention which is limited only by the scope of the claims appended hereto and their legal equivalents.

What is claimed is:

[1. A blower for a climate control device having a surface with a plurality of mounting holes arranged in a pattern on the surface for mounting the blower to the surface of the device, the blower comprising:

a blower housing top piece having a peripheral edge that extends around the top piece, a plurality of lugs that project outwardly from the peripheral edge with each lug having a lug hole;

a blower housing annular wall having a volute shape with a discharge pipe projecting from the annular wall, the annular wall extending around the peripheral edge of the top piece and being dimensioned to be positioned on the device surface inside the pattern of the plurality of mounting holes with the lug holes of the top piece aligned with the plurality of mounting holes; and, a blower housing bottom piece having a peripheral edge that extends around the bottom piece, a plurality of mounting flanges that project outwardly from the bottom piece peripheral edge with each mounting flange having a flange hole, the bottom piece being positioned on an opposite side of the annular wall from the top piece and being dimensioned to be positioned on the device surface with the flange holes aligned with the plurality of mounting holes.]

[2. The blower of claim 1, further comprising:

the blower housing annular wall extending around the peripheral edge of the bottom piece.]

[3. The blower of claim 1, further comprising:

each lug of the plurality of lugs being positioned opposite a mounting flange of the plurality of mounting flanges on opposite sides of the annular wall.]

[4. The blower of claim 1, further comprising:

each lug hole being positioned opposite a flange hole on opposite sides of the annular wall.]

[5. The blower of claim 1, further comprising:

the plurality of lugs being spatially arranged around the top piece peripheral edge and the plurality of mounting flanges being spatially arranged around the bottom piece peripheral edge.]

6. [The blower of claim 1, further comprising:] *A blower for a climate control device having a surface with a plurality of mounting holes arranged in a pattern around the surface for mounting the blower to the surface of the device, the blower comprising:*

*a blower housing top piece having a peripheral edge that extends around the top piece, a plurality of lugs that project outwardly from the peripheral edge with each lug having a lug hole;*

*a blower housing annular wall having a volute shape with a discharge pipe projecting from the annular wall, the annular wall extending around the peripheral edge of the top piece and being dimensioned to be positioned on the device surface inside the pattern of the plurality of mounting holes with the lug holes of the top piece aligned with the plurality of mounting holes;*

*a blower housing bottom piece having a peripheral edge that extends around the bottom piece, a plurality of mounting flanges that project outwardly from the bottom piece peripheral edge with each mounting flange having a flange hole, the bottom piece being positioned on an opposite side of the annular wall from the top piece and being dimensioned to be positioned on the device with the flange holes aligned with the plurality of mounting holes;*

*a plurality of fasteners, each fastener having a head and a shaft and each fastener shaft having a cylindrical length that extends through a lug hole, across the annular wall, and through a flange hole with a spacing between the annular wall and the shaft being substantially constant along a majority of the shaft length; and,* a plurality of legs spatially arranged around the top piece peripheral edge and the bottom piece peripheral edge, each leg projecting outwardly from the top piece peripheral edge and the bottom piece peripheral edge and each leg having an interior surface that extends between a lug hole and a flange hole.

7. [The blower of claim 1, further comprising:] *A blower for a climate control device having a surface with a plurality of mounting holes arranged in a pattern around the surface for mounting the blower to the surface of the device, the blower comprising:*

*a blower housing top piece having a peripheral edge that extends around the top piece, a plurality of lugs that project outwardly from the peripheral edge with each lug having a lug hole;*

*a blower housing annular wall having a volute shape with a discharge pipe projecting from the annular wall, the annular wall extending around the peripheral edge of the top piece and being dimensioned to be positioned on the device surface inside the pattern of the plurality of mounting holes with the lug holes of the top piece aligned with the plurality of mounting holes;*

*a blower housing bottom piece having a peripheral edge that extends around the bottom piece, a plurality of mounting flanges that project outwardly from the bottom piece peripheral edge with each mounting flange having a flange hole, the bottom piece being positioned on an opposite side of the annular wall from the top piece and being dimensioned to be positioned on the device with the flange holes aligned with the plurality of mounting holes;*

*a plurality of fasteners, each fastener having a head and a shaft and each fastener shaft having a cylindrical length that extends through a lug hole, across the annular wall, and through a flange hole with a spacing between the annular wall and the shaft being substantially constant along a majority of the shaft length; and,*

*a* plurality of legs spatially arranged around the top piece peripheral edge and the bottom piece peripheral edge and extending across the annular wall between a lug and a mounting flange, each leg projecting outwardly from the top piece peripheral edge, the bottom piece peripheral edge and the annular wall.

[8. The blower of claim 1, further comprising:

each of the lug holes and each of the flange holes having oblong shapes.]

[9. The blower of claim 1, further comprising:

the top piece having a shaft hole extending through the top piece and a plurality of mounting fittings spatially arranged around the shaft hole to enable attaching a motor to the top piece with a shaft of the motor passing through the shaft hole.]

[10. The blower of claim 3, further comprising:

each lug hole having an oblong shape.]

[11. A blower for a climate control device having a surface for mounting the blower to the device, the blower comprising:

a blower housing top piece having a peripheral edge that extends around the top piece, a shaft hole extending through the top piece and a plurality of mounting fittings spatially arranged around the shaft hole for attaching a motor to the top piece with a shaft of the motor passing through the shaft hole, a blower housing annular wall having a volute shape with a discharge pipe projecting from the annular wall, the annular wall extending around the peripheral edge of the top piece; and, a plurality of legs spatially arranged around the peripheral edge of the top piece and projecting outwardly from the peripheral edge and outwardly from the annular wall, the legs extending from the top piece peripheral edge across the annular wall to support the top piece in a horizontal orientation above the annular wall and the climate control device surface when the blower is mounted on the device surface.]

[12. The blower of claim 11, further comprising:

a motor mounted on the top piece by the mounting fittings, the plurality of legs supporting the motor in a vertical orientation on the top piece and supporting the top piece in a horizontal orientation above the annular wall and the climate control device surface when the blower is mounted on the surface.]

[13. The blower of claim 11, further comprising:

a plurality of fasteners extending through the plurality of legs to mount the blower to the climate control device surface.]

[14. The blower of claim 13, further comprising:

each of the plurality of fasteners has a driving end that seats against the top piece.]

[15. The blower of claim 14, further comprising:

each fastener driving end extending horizontally over the annular wall.]

16. [The blower of claim 11, further comprising:] *A blower for a climate control device having a surface for mounting the blower to the device, the blower comprising:*

*a blower housing top piece having a peripheral edge that extends around the top piece, a shaft hole extending through the top piece and a plurality of mounting fittings spatially arranged around the shaft hole for attaching a motor to the top piece with a shaft of the motor passing through the shaft hole,*

*a blower housing annular wall having a volute shape with a discharge pipe projecting from the annular wall, the annular wall extending around the peripheral edge of the top piece;*

*a plurality of legs spatially arranged around the peripheral edge of the top piece and projecting outwardly from the peripheral edge and outwardly from the annular wall, the legs extending from the top piece peripheral edge across the annular wall to support the top piece in a position on an opposite side of the annular wall from the climate control device surface when the blower is mounted on the device surface;*

*a plurality of fasteners extending across the annular wall, each fastener having a shaft with a driving end at one end of the shaft and a driven end at an opposite end of the shaft, each fastener shaft having a length that is positioned adjacent and substantially parallel to the annular wall for a majority of the shaft length, and each fastener driving end seating against the top piece; and,* a plurality of lugs spatially arranged around the top piece peripheral edge projecting outwardly from the peripheral edge, each lug has a lug hole, and the plurality of legs extend downwardly from the plurality of lugs.

17. [The blower of claim 11, further comprising:] *A blower for a climate control device having a surface for mounting the blower to the device, the blower comprising:*

*a blower housing top piece having a peripheral edge that extends around the top piece, a shaft hole extending through the top piece and a plurality of mounting fittings spatially arranged around the shaft hole for attaching a motor to the top piece with a shaft of the motor passing through the shaft hole,*

*a blower housing annular wall having a volute shape with a discharge pipe projecting from the annular wall, the annular wall extending around the peripheral edge of the top piece;*

*a plurality of legs spatially arranged around the peripheral edge of the top piece and projecting outwardly from the peripheral edge and outwardly from the annular wall, the legs extending from the top piece peripheral edge across the annular wall to support the top piece in a position on an opposite side of the annular wall from the climate control device surface when the blower is mounted on the device surface;*

*a plurality of fasteners extending across the annular wall, each fastener having a shaft with a driving end at one end of the shaft and a driven end at an opposite end of the shaft, each fastener shaft having a length that is positioned adjacent and substantially parallel to the annular wall for a majority of the shaft length, and each fastener driving end seating against the top piece; and,* a blower housing bottom piece having a peripheral edge that extends around the bottom piece, a plurality of mounting flanges that project outwardly from the bottom piece peripheral edge with each mounting flange being positioned to be engaged by a leg of the plurality of legs when the blower housing is mounted on the climate control device surface.

18. The blower of claim 17, further comprising:

each mounting flange having a flange hole.

19. The blower of claim 17, further comprising:

blower housing annular wall extends around the peripheral edge of the bottom piece.

[20. A blower for a climate control device having a surface with a plurality of mounting holes arranged in a pattern on the surface for mounting the blower to the surface of the device, the blower comprising:

a blower housing annular wall having a volute shape with a discharge pipe projecting from the annular wall, the annular wall being dimensioned to be positioned on the device surface inside the pattern of the plurality of mounting holes;

a blower housing top piece extending across the annular wall, the blower housing top piece having a plurality of lug holes spatially arranged outside the annular wall and in a pattern that aligns each lug hole with a mounting hole on the device surface when mounting the blower to the device surface, each of the lug holes having an oblong shape; and, a blower housing bottom piece extending across the annular wall on an opposite side of the annular wall from the blower housing top piece, the bottom piece having a plurality of flange holes spatially arranged outside the annular wall and in a pattern that aligns each flange hole with a mounting hole on the device surface when mounting the blower to the device surface, and each of the flange holes having an oblong shape.]

[21. The blower of claim 20, further comprising:

the top piece having a peripheral edge that follows the volute shape of the annular wall and the bottom piece having a peripheral edge that follows the volute shape of the annular wall.]

[22. The blower of claim 20, further comprising:

the top piece having a peripheral edge and a plurality of lugs projecting outwardly from the peripheral edge with the plurality of lug holes being in the plurality of lugs; and the bottom piece having a peripheral edge and a plurality of mounting flanges projecting outwardly from the peripheral edge with the plurality of flange holes being in the mounting flanges.]

23. [The blower of claim 20, further comprising:] *A blower for a climate control device having a surface with a plurality of mounting holes arranged in a pattern on the surface for mounting the blower to the surface of the device, the blower comprising:*

*a blower housing annular wall having a volute shape with a discharge pipe projecting from the annular wall, the annular wall being dimensioned to be positioned on the device surface inside the pattern of the plurality of mounting holes;*

*a blower housing top piece extending across the annular wall, the blower housing top piece having a plurality of lug holes spatially arranged outside the annular wall and in a pattern that aligns each lug hole with a mounting hole on the device surface when mounting the blower to the device surface, each of the lug holes having an oblong shape;*

*a blower housing bottom piece extending across the annular wall on an opposite side of the annular wall from the blower housing top piece, the bottom piece having a plurality of flange holes spatially arranged outside the annular wall and in a pattern that aligns each flange hole with a mounting hole on the device surface when mounting the blower to the device surface, and each of the flange holes having an oblong shape;*

*a plurality of fasteners, each fastener having a head and a shaft and each fastener shaft having a cylindrical length that extends through a lug hole, across the annular wall, and through a flange hole with a spacing between the annular wall and the shaft being substantially constant along a majority of the shaft length; and,* the top piece having a peripheral edge;

the bottom piece having a peripheral edge; and, a plurality of legs that project outwardly from the top piece peripheral edge and the bottom piece peripheral edge and extend between the plurality of lug holes and the plurality of flange holes.

*24. A blower housing comprising:*

*a top piece having an outer peripheral edge;*

*an annular wall; and,*

*a bottom piece having an outer peripheral border, the bottom piece being connectable with the top piece with the annular wall between the bottom piece and top piece, the bottom piece having a plurality of mounting flanges that project outwardly from the bottom piece outer peripheral border and each of the mounting flanges has a flange hole with an inner edge configured to position a fastener flush along at least a majority of the annular wall;*

*the top piece has a plurality of lugs that project outwardly from the top piece outer peripheral edge and each lug has a leg that extends across the annular wall and connects with a mounting flange of the bottom piece; and,*

*each leg has an arcuate interior surface that opposes the annular wall.*

*25. The blower housing of claim 24, wherein:*

*each lug has a lug hole that is aligned with a flange hole enabling fasteners to be positioned through the lug holes, between the annular wall and the arcuate interior surfaces of the legs and through the flange holes.*

*26. A blower for a climate control device having a surface with a plurality of mounting holes arranged in a pattern on the surface for mounting the blower to the surface of the device, the blower comprising:*

*a blower housing annular wall having a volute shape with a discharge pipe projecting from the annular wall, the annular wall being dimensioned to be positioned on the device surface inside the pattern of the plurality of mounting holes;*

*a blower housing top piece extending across the annular wall, the blower housing top piece having a plurality of lug holes spatially arranged outside the annular wall and in a pattern that aligns each lug hole with a mounting hole on the device surface when mounting the blower to the device surface, each of the lug holes having an oblong shape;*

*a blower housing bottom piece extending across the annular wall on an opposite side of the annular wall from the blower housing top piece, the bottom piece having a plurality of flange holes spatially arranged outside the annular wall and in a pattern that aligns each flange hole with a mounting hole on the device surface when mounting the blower to the device surface, and each of the flange holes having an oblong shape;*

*a plurality of fasteners, each fastener having a head and a shaft and each fastener shaft having a cylindrical length that extends through a lug hole, across the annular wall, and through a flange hole with a spacing between the annular wall and the shaft being substantially constant along a majority of the shaft length; and,*

*each fastener head having a width that is larger than a width of the fastener shaft, and each fastener head being positioned in engagement with a lug outside the lug hole.*

*27. The blower of claim 26, further comprising:*

*each fastener head overlapping an end of the annular wall.*

* * * * *